US008918530B2

(12) United States Patent
Stoyanov et al.

(10) Patent No.: US 8,918,530 B2
(45) Date of Patent: Dec. 23, 2014

(54) PLUG AND PLAY DEVICE REDIRECTION FOR REMOTE SYSTEMS

(75) Inventors: Vladimir K Stoyanov, Redmond, WA (US); Makarand V. Patwardhan, Redmond, WA (US); Joy Chik, Sammamish, WA (US); Nelly L. Porter, Redmond, WA (US); Zardosht Kasheff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 11/278,529

(22) Filed: Apr. 3, 2006

(65) Prior Publication Data

US 2007/0061477 A1    Mar. 15, 2007

Related U.S. Application Data

(60) Provisional application No. 60/716,025, filed on Sep. 9, 2005.

(51) Int. Cl.
| G06F 15/16 | (2006.01) |
| G06F 15/173 | (2006.01) |
| G06F 9/44 | (2006.01) |
| H04L 12/28 | (2006.01) |
| H04L 29/08 | (2006.01) |

(52) U.S. Cl.
CPC ............. *H04L 67/34* (2013.01); *G06F 9/4411* (2013.01); *H04L 12/2814* (2013.01); *G06F 9/4413* (2013.01)
USPC .......................................... 709/230; 709/238

(58) Field of Classification Search
USPC ................................................ 709/230, 238
See application file for complete search history.

(56) References Cited

U.S. PATENT DOCUMENTS

| 5,315,698 | A |   | 5/1994 | Case et al. |
| 5,710,941 | A | * | 1/1998 | Parry ............................... 710/14 |
| 5,732,282 | A |   | 3/1998 | Provino et al. |
| 5,748,980 | A | * | 5/1998 | Lipe et al. .......................... 710/8 |
| 5,761,411 | A | * | 6/1998 | Teague et al. ................. 714/47.2 |

(Continued)

FOREIGN PATENT DOCUMENTS

| CN | 1257591 A | 6/2000 |
| CN | 1307293 A | 8/2001 |

(Continued)

OTHER PUBLICATIONS

Takahiro Hirofuchi, Eiji Kawai, Kazutoshi Fujikawa, and Hideki Sunahara, USB/IP—a Peripheral Bus Extension for Device Sharing over IP Network, Apr. 10-15, 2005, USENIX Association, pp. 1-14.*

(Continued)

*Primary Examiner* — Tauqir Hussain
*Assistant Examiner* — Angela Widhalm
(74) *Attorney, Agent, or Firm* — Kate Drakos; Micky Minhas

(57) ABSTRACT

A remote access system connects a server computer with one or more client computers, where devices are connected locally at the client computers. The devices are recognized by the client computers and a device driver is provided for each connected and recognized device. A virtual driver is created at the server computer from information specific to the device, such that the virtual driver acts as an actual driver to an application on the server computer. The application through the virtual driver is able to recognize and provide commands to the connected device.

14 Claims, 4 Drawing Sheets

(56) References Cited

U.S. PATENT DOCUMENTS

| | | | |
|---|---|---|---|
| 6,157,965 A * | 12/2000 | Mohammed et al. | 710/8 |
| 6,247,067 B1 * | 6/2001 | Berliner et al. | 719/321 |
| 6,321,279 B1 * | 11/2001 | Bonola | 710/36 |
| 6,384,931 B1 | 5/2002 | Brown et al. | |
| 6,388,679 B1 | 5/2002 | Kluck et al. | |
| 6,388,687 B1 | 5/2002 | Brackett et al. | |
| 6,466,982 B1 * | 10/2002 | Ruberg | 709/227 |
| 6,549,934 B1 * | 4/2003 | Peterson et al. | 709/203 |
| 6,779,185 B1 * | 8/2004 | Roukbi et al. | 719/321 |
| 6,788,429 B1 | 9/2004 | Clough et al. | |
| 6,810,412 B1 * | 10/2004 | Chang | 709/203 |
| 6,874,147 B1 * | 3/2005 | Diamant | 719/328 |
| 6,925,528 B2 * | 8/2005 | Selkirk et al. | 711/114 |
| 6,934,711 B2 * | 8/2005 | Pooni et al. | 1/1 |
| 6,993,642 B2 * | 1/2006 | Burkhardt et al. | 713/1 |
| 6,993,649 B2 * | 1/2006 | Hensley | 713/2 |
| 7,006,467 B2 * | 2/2006 | Anton et al. | 370/329 |
| 7,058,788 B2 * | 6/2006 | Niles et al. | 711/220 |
| 7,117,495 B2 * | 10/2006 | Blaser et al. | 717/174 |
| 7,181,382 B2 * | 2/2007 | Shier et al. | 703/13 |
| 7,207,041 B2 * | 4/2007 | Elson et al. | 718/104 |
| 7,222,359 B2 * | 5/2007 | Freund et al. | 726/3 |
| 7,317,914 B2 * | 1/2008 | Adya et al. | 455/421 |
| 7,404,193 B2 * | 7/2008 | Hen et al. | 719/327 |
| 7,421,710 B2 * | 9/2008 | Qi et al. | 719/321 |
| 7,461,144 B1 * | 12/2008 | Beloussov et al. | 709/223 |
| 7,505,455 B1 * | 3/2009 | Goodwin et al. | 370/356 |
| 7,506,343 B2 * | 3/2009 | Aslot et al. | 719/324 |
| 7,562,393 B2 * | 7/2009 | Buddhikot et al. | 726/26 |
| 7,617,414 B2 * | 11/2009 | Becker et al. | 714/15 |
| 7,660,910 B2 * | 2/2010 | Miller et al. | 710/2 |
| 7,698,122 B2 * | 4/2010 | Chrysanthakopoulos | 703/24 |
| 7,698,550 B2 * | 4/2010 | Abhishek et al. | 713/160 |
| 7,730,157 B2 * | 6/2010 | Baratto et al. | 709/217 |
| 7,792,923 B2 * | 9/2010 | Kim | 709/218 |
| 7,810,089 B2 * | 10/2010 | Sundarrajan et al. | 717/174 |
| 7,865,910 B2 * | 1/2011 | Durojaiye et al. | 719/324 |
| 7,913,226 B2 * | 3/2011 | Lowell et al. | 717/120 |
| 2001/0007140 A1 * | 7/2001 | Landry et al. | 714/48 |
| 2002/0004852 A1 * | 1/2002 | Sadovsky et al. | 709/321 |
| 2002/0018234 A1 | 2/2002 | Fu et al. | |
| 2002/0196941 A1 * | 12/2002 | Isaacson et al. | 380/231 |
| 2003/0023770 A1 | 1/2003 | Barmettler et al. | |
| 2003/0045316 A1 | 3/2003 | Tjong et al. | |
| 2003/0088642 A1 | 5/2003 | Price et al. | |
| 2003/0117638 A1 | 6/2003 | Ferlitsch | |
| 2003/0159140 A1 | 8/2003 | Candelore | |
| 2003/0200289 A1 | 10/2003 | Kemp et al. | |
| 2004/0073912 A1 * | 4/2004 | Meza | 719/321 |
| 2004/0088557 A1 | 5/2004 | Malcolm et al. | |
| 2004/0128412 A1 | 7/2004 | Harrison | |
| 2004/0190042 A1 | 9/2004 | Ferlitsch et al. | |
| 2004/0218580 A1 * | 11/2004 | Bahl et al. | 370/350 |
| 2004/0239986 A1 * | 12/2004 | Wise | 358/1.15 |
| 2005/0002525 A1 | 1/2005 | Alkove et al. | |
| 2005/0056480 A1 | 3/2005 | Sugiyama et al. | |
| 2005/0057519 A1 * | 3/2005 | Coe et al. | 345/168 |
| 2005/0102452 A1 | 5/2005 | Williams et al. | |
| 2005/0114870 A1 * | 5/2005 | Song et al. | 719/328 |
| 2005/0228933 A1 * | 10/2005 | Tsai | 710/313 |
| 2006/0069750 A1 * | 3/2006 | Momtchilov et al. | 709/219 |
| 2006/0259818 A1 * | 11/2006 | Howell et al. | 714/21 |
| 2011/0035758 A1 | 2/2011 | Stoyanov et al. | |

FOREIGN PATENT DOCUMENTS

| | | |
|---|---|---|
| CN | 1453696 A | 11/2003 |
| EP | 1164482 A2 | 12/2001 |
| EP | 1553746 | 7/2005 |
| JP | Hei 11-184793 | 7/1999 |
| JP | 2002-024154 | 1/2002 |
| JP | 2002-373144 | 12/2002 |
| JP | 2004-527817 | 9/2004 |
| JP | 2004-326776 | 11/2004 |
| JP | 2005-210713 | 8/2005 |
| JP | 2008-515083 | 5/2008 |
| JP | 2009-508212 | 2/2009 |
| KR | 1020050037537 A | 4/2005 |
| KR | 100631620 B1 | 9/2006 |
| KR | 10-0706747 | 4/2007 |
| WO | WO0057587 A1 | 9/2000 |
| WO | WO0241133 | 5/2002 |
| WO | WO03036486 A2 | 5/2003 |

OTHER PUBLICATIONS

Hirofuchi, et al., "USB/IP—a Peripheral Bus Extension for Device Sharing over IP Network", Proceedings of the Usenix Annual Technical Conference, Apr. 9, 2005, pp. 47-60.
Notice of Third Office Action from Chinese Patent Office for application No. 200680031439.4, mailed Nov. 26, 2010, (17 pages).
Notice of Second Office Action from Chinese Patent Office for application No. 200680031439.4, mailed Sep. 10, 2010, (16 pages).
Notice of First Office Action from Chinese Patent Office for application No. 200680031439.4, mailed Aug. 7, 2009, (15 pages).
Office Action from European Patent Office for application No. 06 789 751.2, mailed Jan. 8, 2010 (5 pages).
European Search Report for application No. 06 789 751.2, mailed Nov. 6, 2009 (5 pages).
Chinese Notice of Final Rejection from Chinese Patent Office for application No. 200680031439.4, mailed Feb. 3, 2012, 12 pgs.
International Search Report, date Jan. 2, 2007, International Application No. PCT/US2006/031708; 5 pages.
Japanese Notice of Allowance in Application 2008-530059, mailed Nov. 2, 2012, 6 pgs.
Japanese Notice of Allowance in Application 2012-103736, mailed Jul. 2, 2013, 6 pgs.
Japanese Notice of Rejection in Application 2008-530059, mailed Feb. 3, 2012, 11 pgs.
Japanese Notice of Rejection in Application 2008-530059, mailed Jul. 8, 2011, 4 pgs.
Japanese Notice of Rejection in Application 2012-103736, mailed Nov. 6, 2012, 7 pgs.
U.S. Appl. No. 12/907,832, Amendment and Response filed Feb. 1, 2012, 13 pgs.
U.S. Appl. No. 12/907,832, Amendment and Response filed May 31, 2011, 11 pgs.
U.S. Appl. No. 12/907,832, Office Action mailed Feb. 3, 2011, 19 pgs.
U.S. Appl. No. 12/907,832, Office Action mailed Sep. 1, 2011, 32 pgs.
Chinese Notice on Reexamination from Chinese Patent Office for application No. 200680031439.4, mailed Mar. 12, 2014, 13 pgs.
U.S. Appl. No. 12/907,832, Notice of Allowance mailed Apr. 1, 2014, 15 pgs.
U.S. Appl. No. 12/907,832, Notice of Allowance mailed Jun. 11, 2014, 7 pgs.
Microsoft Windows 2000 Terminal Services Printer Redirection—White Paper, 2002.
Microsoft, "Remote Desktop Features" Available at http://www.microsoft.com/resources/documentation/Windows/XP/all/reskit/en-us/Default.asp?url=/resources/documentation/Windows/XP/all/reskit/en-us/pree_rem_lshw.asp, printed on Feb. 8, 2006.
Pan et al., "Remote Management with Virtual Media in the DRAC 4" Available at http://www.dell.com/downloads/global/power/ps4q04-20040105-Pan.pdf, Oct. 2004, pp. 30-34.
"USB Support in MetaFrame Products", Available at http://www.dabcc.com/thinsol/Files/ctx816193.htm, Oct. 8, 2001, pp. 1-3.
U.S. Appl. No. 12/907,832, Notice of Allowance mailed Aug. 29, 2014, 3 pgs.
U.S. Appl. No. 12/907,832, Amendment and Response filed Sep. 11, 2014, 6 pgs.
U.S. Appl. No. 12/907,832, Notice of Allowance mailed Oct. 23, 2014, 3 pgs.
Chinese 1st Office Action in Application 201210154728.0, mailed Oct. 17, 2014, 12 pgs.

* cited by examiner

PLUG AND PLAY DEVICE REDIRECTION FOR REMOTE SYSTEMS

RELATED APPLICATIONS

The present application claims priority under 35 U.S.C. §119(e) to U.S. Provisional Application No. 60/716,025, filed Sep. 9, 2005, the disclosure of which is incorporated herein.

BACKGROUND

Remote client access platforms and systems, such as Terminal Service™ systems provided by the Microsoft Corporation, allow computers (users) to remotely access application programs hosted by and resident at an application server or servers (server computer). In remote client access systems, client computers typically rely on a server computer to provide computing functionality through the resident application programs. Examples of application programs include word processing, multimedia, and data management programs.

The server computer may be referred to as a host computer or terminal server. In certain cases, there may be multiple server computers. The client computer may be referred to as a remote terminal, remote client, or thin client. The client computer primarily is used for user interface: interaction with a user and device input/output; however, in many cases, a local device or devices are attached to the client computer and accessed by the server computer.

Software on the client computer is typically generic or not application specific, generally consisting of an operating system and general purpose software which includes software to support the remote client access environment. Software at the server computer typically includes specific-purpose application software that provides particular functionality such as multimedia, imaging, database access, word processing, and other types of applications. Data communicated between the client computer and the server computer mostly includes commands and data relating to user interface, such as graphics data, keystrokes, mouse movements, etc., as well as commands and data relating to hardware devices located at the client computer.

The server computer and client computers typically communicate or pass information with one another using a pre-defined communication protocol such as the remote desktop protocol (RDP) as defined by the Microsoft Corporation. Lower level network protocols such as transmission control protocol over Internet protocol (TCP/IP) are also involved.

Benefits of remote client access systems are that the client computers can be relatively low-powered since most functionality and computation takes place at the server computer. Although the server computer is often more expensive than a typical desktop computer, one application server computer can service many less expensive client computers.

Another advantage in some remote client access systems is that data can reside at the physical location of the server computer; and can be acted upon at that location by application programs without having to be transferred over relatively slow communications links to the client computers—only the user interface is implemented at the physical locations of clients.

Client computers have ports, such as universal serial bus (USB) or FireWire (IEEE 1394) ports, to which one or more local or peripheral hardware devices are attached. Such devices may relate to the user interface, as in the case of USB keyboards. In many cases applications executing at the server computer need to access and interact with such local client devices. Examples of local or peripheral devices include audio recorders, digital cameras, document scanners, external disk drives, and media readers, etc. Such devices are sometimes referred to as plug and play or PNP devices, since the devices become available for use once they are connected to a port.

In a typical Windows®-based desktop environment, local applications communicate with local devices through a series of drivers, referred to as a driver stack. The driver stack particularly is used to facilitate PNP capability of a device. Different responsibilities may be divided among components of the driver stack for purposes of organization and re-usability. For example, some of the drivers are generic to all or certain general classes of local devices and can be used or re-used to communicate with many different devices. Other drivers implement functionality specific to certain devices, and are often designed specifically to accompany these certain devices. Typically, such issues are addressed on a case-by-case basis. For example, in order to support a local device, a corresponding software driver is installed on the local machine or client computer. With different and multiple devices, problems arise as to providing different and correct software drivers to support different hardware devices.

In certain cases, a user may not be using the same client computer in which a particular device is connected; however, the user desires to access or make use of the device. This may be the case, when the user is working "remotely" from another client computer. Furthermore, it may desirable for the server computer to provide access to the local device to more than one client computer or user. Therefore, in a remote client access system, it is desirable for a device at a particular remote client computer to appear to be locally connected to a server computer so that other remote client computers may access the device.

SUMMARY

Devices are connected and recognized locally at client computers, and a device driver as part of a driver stack is installed at the client computer to support each device connected at the client computer. The connection of a device is communicated to a server computer, along with information to create a virtual driver at the server computer. The virtual driver is recognized by an application resident at the server computer. Commands from the server computer may then be passed to the device through the virtual driver and communicated back to the device driver, allowing control of the device by the server computer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
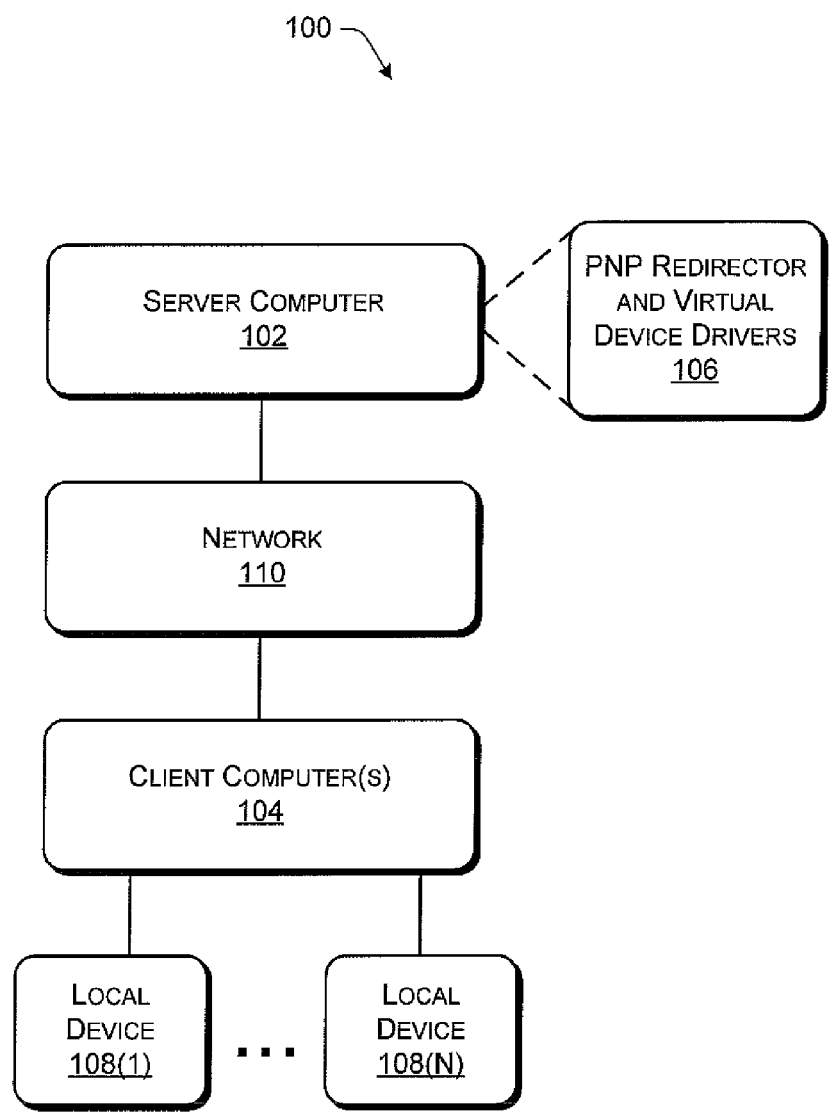
FIG. 1 is an illustration of a remote client access system that includes a server computer with virtual drivers that support plug and play devices connected at remote client computers.

FIG. 1 shows a remote client access system or remote system 100. The remote system 100 includes a server computer 102 and one or more client computers 104. In particular, the server computer 102 includes a plug and play (PNP) device or PNP redirector and virtual device drivers to facilitate or support devices that are locally connected to the client computers.

In this example, a single client computer 104 is shown; however, in other implementations, multiple client computers may be included. Access and control of local devices 108 connected at the client computer 104 may be directed or redirected to the server computer 102 such that the local devices 108 may be selectively accessed and controlled by the server computer 102. The remote system 100 may be a Terminal Service™ system as provided or defined by the Microsoft Corporation, where multiple client computers (e.g., client computer 104) rely on server computer 102 for all or certain application programs that provide functionality.

A network 110 connects server computer 102 and client computer 104. The network 110 may be implemented in a number of ways to support such networking contexts, including both wired-based technologies and wireless technologies. Aspects of this invention are not limited to one specific network architecture or network technology. The remote system 100 is representative of different architectures which include direct dialup via modem, enterprise LANs (local area networks), WANs (wide area networks) and the Internet. Network 110 connects the server computer 102 to one or more client computers (e.g., client computer 104). Furthermore, the network 108 connection between the server computer 102 and client computer 104 may implement a transport protocol such as transmission control protocol over Internet protocol (TCP/IP).

The server computer 102 is implemented with an operating system such as Windows® Server 2003 operating system provided by the Microsoft Corporation. Server computer 102 and client computer 104 may implement a communication protocol such as remote data protocol (RDP) defined by the Microsoft Corporation, in order to pass data or information (i.e., communicate) with one another. The use of such communication protocols, and particularly RDP, may be implemented in the context of a remote client access system such as a Terminal Services™ system.

In addition, communications to server computer 102 and client computer 104 may make use of I/O request packets (IRP) communicated over RDP, and particularly a specific group of IRP called I/O control (IOCTL) code. In particular, application programs resident at the server computer 102 may implement IRP to communicate with local devices 108. An IRP may be communication data originating from application programs that include requests to one or more of local devices 108. The local devices may be identified by the application programs as a physical device object (PDO) in IOCTL code, where each particular device 108 is identified by a particular PDO. A real device driver as described below may create the PDO for the local device 108.

Client computer 104 may be a general-purpose PC (personal computer), a laptop PC, tablet PC, or the like, and implement an operating system such as a Windows® brand operating system from the Microsoft Corporation. Client computer 104 is a standalone computer that primarily interfaces to server computer 102 to access files or other information (e.g., application programs resident at application server computer 102) that are not locally stored at client computer 104.

Client computer 104 is equipped with one or more device ports that connect PNP devices, such as local devices 108. The device ports include USB 1.0, 1.1 and 2.0, and FireWire (IEEE 1394) ports that support existing (i.e., legacy) and future standards. In particular, the device ports allow the connection of the local devices 108 to client computer 104. Local devices 108 include, but are not limited to, digital cameras, video cameras, hard disk storage devices, digital media recorders, printers, scanners, etc. Server computer 102 includes a PNP redirector and virtual device drivers 106. In particular, as further discussed in detail below, the PNP redirector is configured to detect, or be informed by client computer 104, as to a connection of one or more local devices 108. The virtual device drivers are created at the server computer 102 to perform the function of actual device drivers found at the client computer 104.

Figure 2:
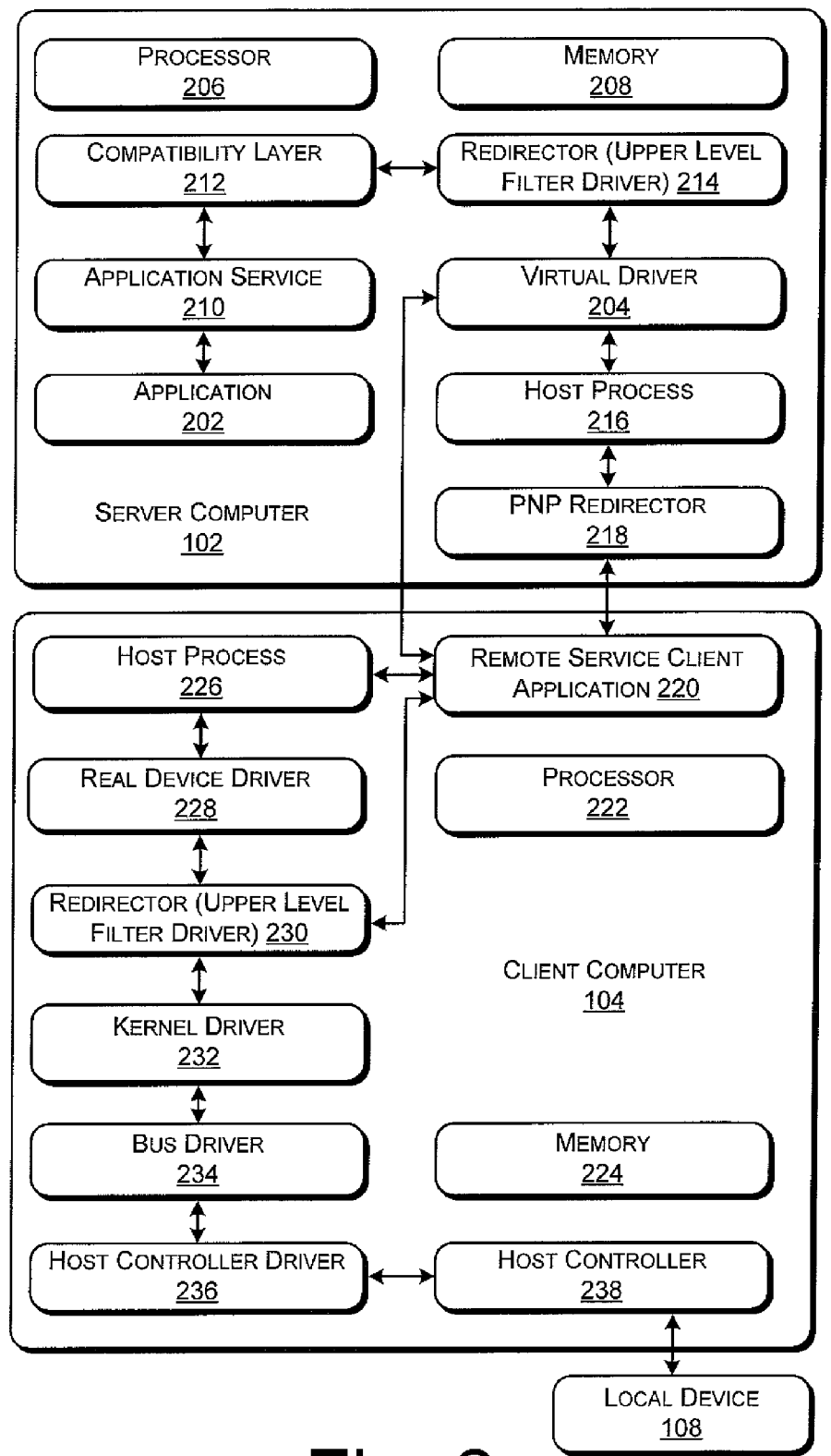
FIG. 2 is an illustration of the server computer and the client computer, and illustrates driver stacks of the server computer and the client computer.

FIG. 2 shows exemplary driver stacks of the server computer 102 and client computer 104. The driver stacks are example configurations that may be used to direct command and control of a local device 108 to an application 202 resident at server computer 102. In particular, a remote service driver or virtual driver 204 specific to the particular local device 108 is created or provided as part of the driver stack of computer 102.

Server computer 102 includes a processing unit or processor 206 and a storage system or memory 208. Processor 206 is configured to control or access components of server computer 102, such as memory 208 and components of the server computer 102 driver stack. Although this example illustrates memory 208 separate from components of the server computer 102 driver stack, it is contemplated that in other implementations, components, as further discussed below, of the server computer 102 driver stack are included in memory 208.

The driver stack of server computer 102 may be considered as including the following components or layers, where application 202 is viewed as the highest level component or layer of the driver stack. Application 202 includes various multimedia, imaging, database access, word processing, and other types of applications. The application 202 may be part of or connected to an application service 210. The application service 210 includes, or is connected to, a compatibility layer 212. Compatibility layer 212 may be implemented when supporting particular local devices which implement formats such as Window® portability device (WPD) formats.

Application service 210 or compatibility layer 212 communicates with an upper level filter driver or redirector 214. Redirector 214 may be an operating system (OS), or kernel, based component (i.e., driver) that reflects or redirects OS commands to the application service 210 or compatibility layer 212. Furthermore, in this implementation redirector 214 is used to communicate to the virtual driver 204.

The virtual driver 204 is created to particularly support local device 108 and communicate with the driver stack of client computer 104. Virtual driver 204 may be included in a host process 216; however, in this example, virtual driver 204 is separate from and communicates with host process 216 as part of the driver stack of server computer 102. The host process 216 communicates with a PNP redirector 218.

PNP redirector 218 particularly provides for communication from the client computer 104 when the virtual driver 204 is initially created. In particular PNP redirector 218 enumerates or identifies devices (i.e., local device 108) that are connected to and are to be redirected from client computer 104. The PNP redirector 218 may include or access a redirection library that provides for IRP based communication between the server computer 102 and client computer 104. In an IRP based communication, a virtual channel may be used. PNP redirector 218 may create a particular PDO representative of the device. In particular the PDO is created when communication involves passing of IRPs between the server computer 102 and client computer 104. Whenever the device is disconnected from the client computer 104, the PNP redirector may destroy the particular PDO.

In communication between application 202 and the local device 108, the virtual driver 204 communicates directly with a remote service client application 220. The remote service client application 220 may be a remote process, such as a process implemented by Terminal Services™ at client computers such as client computer 104. Remote service client application 220 may primarily be used to provide communication between the client computer 104 and the server computer 102.

Similar to server computer 102, client computer 104 includes a processing unit or processor 222 and a storage system or memory 224. Processor 222 is configured to control or access components of client computer 104, such as memory 224 and components of the driver stack of client computer 104. This example illustrates the memory 224 separate from components or the driver stack of the client computer 104; however, it is contemplated that in other implementations, components of the driver stack of client computer 104, as further discussed below, may be included in memory 224.

Remote service client application 220 may be viewed as the top most component or layer of the driver stack of client computer 104. Below remote service client application 222 in the driver stack, is a host process 226. Host process 226 may be a resident application in client computer 104 that communicates with, and creates or provides drivers to facilitate local device 108. In this example, a real device driver 228 particular to local device 106 is created or provided by host process 226.

In a typical driver stack supporting PNP devices, local device 108 relies exclusively on a device driver, such as real device driver 228, to communicate or pass data along the driver stack. In this implementation, real device driver 228 also provides communication for local device 108; however, virtual driver 204, acting as real device driver 228, provides the ability for server computer 102, and particularly application 202, to control or access local device 108.

An upper level filter driver or redirector 230 is included in the driver stack of client computer 104. The redirector 230 allows communications from virtual driver 204 (through remote client application 220) to local device 108. The driver stack of client computer 104 includes an OS level or kernel driver 232 that communicates with a bus driver 234. The bus driver 234 communicates with a host controller driver 236. Local device 108, and other PNP devices, connects to client computer 104, through a port which is connected to a host controller 238. Host controller 238 in turn communicates through the driver stack of client computer 104 through host controller driver 236.

Whenever a new device, such as local device 108, is plugged in or connected to the client computer 104, a device driver, such as real device driver 228, is installed. Real device driver 228 is bound to the newly discovered device or local device 108. An application in the driver stack may now access or use the device (i.e., local device 108). Such an application may include host process 226. When real device driver 228 is created, the virtual driver 204 is also created. The creation of virtual driver 204 allows application 202 to become aware of local device 108.

Communication between the application 202 and the real device driver 228 from the server computer 102 to the client machine 104 is redirected, such that virtual driver 204 acts in place of real device driver 228. Once the relation between virtual driver 204 and application 202 is established, communication between the virtual driver 204 and the application 202 is forwarded to the real device driver 228. The forwarded communication to real device driver 228 allows local device 108 to act in an expected manner. In other words, when the device stack of client computer 104 is created, certain commands or communications may be expected to go through the real device driver 228, such as commands or communications to host process 226.

When local device 108 is redirected to server computer 102, and particularly to application 202, the following sequence of events may take place. The local device 108 is plugged on the client computer 104; device drivers are loaded (i.e., kernel driver 232, redirector 230, and real device driver 228; and a notification is sent to application 202. The client computer 104 recognizes local device 108 and sends information to PNP redirector 218, where the information is used to create the virtual device driver 204. The virtual driver 204 is created and communication link is established with the remote service client application 220. Application 202 is notified of the newly discovered local device 108 and the real device drive 228 that is created and installed. The application 220 then sends I/O to the virtual driver 204 which forwards it to the remote service client application, which forwards it to real device driver 228. If the client hardware (e.g., device 108) is unplugged or the connection between client computer 104 and server computer 102 is broken the virtual driver 204 is unloaded from the server and all communication stopped.

Figure 3:
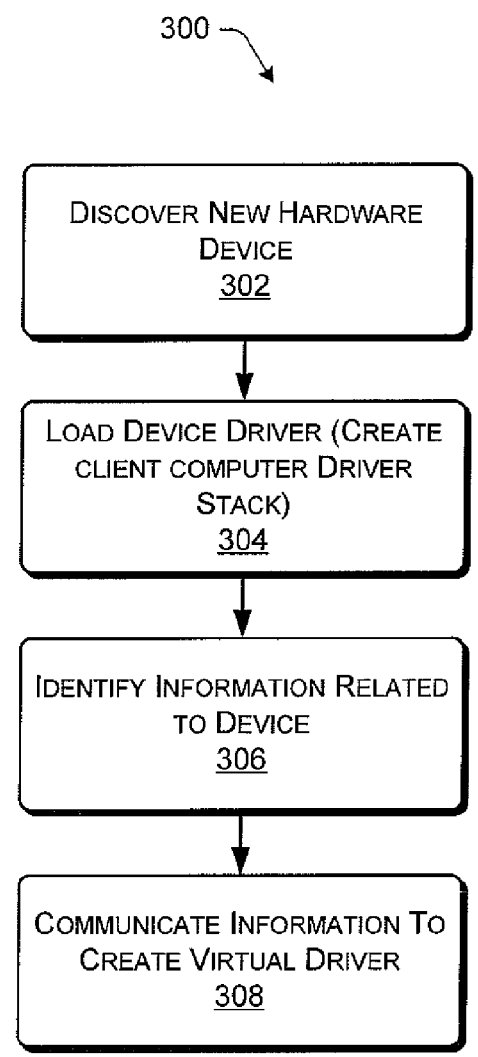
FIG. 3 is a flowchart illustrating a process for creating a virtual driver on a server computer.

FIG. 3 shows a process 300 that provides for the creation of a virtual driver on a server computer. Process 300 may be implemented as protocol by a client computer and a server computer. The process 300 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 300 may be implemented, for example, by the system 100 of FIG. 1 and/or the computers 102 and 104 as discussed in FIG. 2, although the process 300 may be implemented by other architectures.

At block 302, a new hardware device 302 is discovered. The hardware device may be a plug and play (PNP) device that is connected to a client computer, such as local device 108 connected to client computer 104. The particular device may be discovered or identified by an application, such as host process 226, that is resident on the client computer 104. Furthermore, the discovering of the local device 108 may be part of a PNP process.

At block 304, the client computer 104 loads or installs the necessary drivers or driver stack to support the detected device. The installation may be performed by the host process 226 or another application resident at the client computer 104. The installation may further be part of a typical PNP device operation when a device is connected to the client computer 104. The drivers may include the device driver (e.g., real device driver 228); an upper level filter driver (e.g., redirector 230); a kernel driver (e.g., kernel driver 232); and a bus driver (e.g., bus driver 232).

At block 306, information related to the device is identified. The identification may be performed by an application that provides for communication between the server computer and the client computer. Remote service client application 220 is an example of such a communication application. Communication may employ packets such as I/O request packets (IRP) communicated over RDP, and particularly a specific group of IRP called I/O control (IOCTL) code. The device may also be identified as a physical device object (PDO) in IOCTL code.

At block 308, device related information is communicated to the server computer 102. The information may be passed on by the application providing communication between the server computer 102 and the client computer 104 (e.g. remote service client application 220). The communicated information is particularly used to create a virtual driver (e.g., virtual driver 204) at the server computer 102, where the virtual driver is specific to the discovered device (e.g., local device 108). The virtual driver may be created by an application such as application 202 or service such as application service 210.

Figure 4:
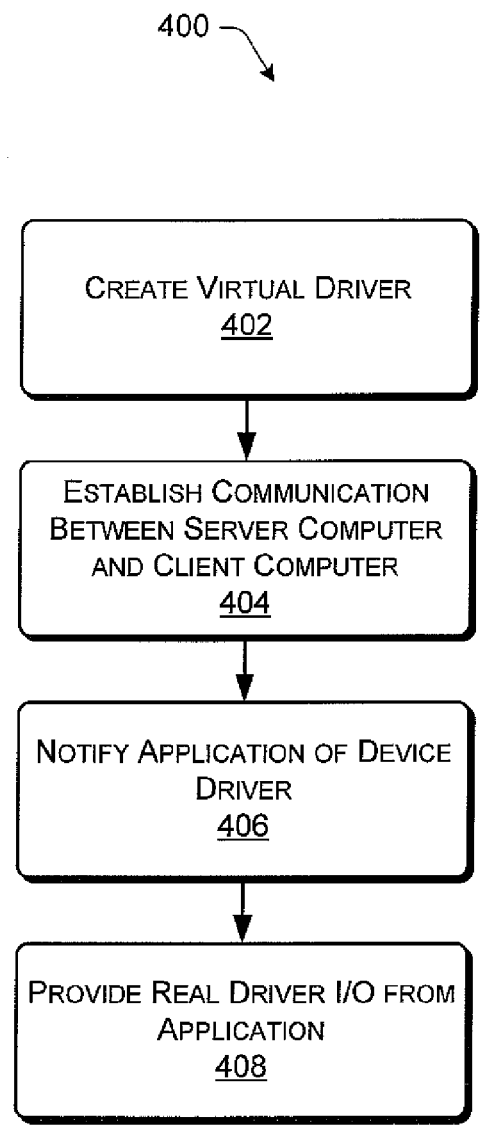
FIG. 4 is a flowchart illustrating a process that provides for redirection of client computer devices to a server computer.

FIG. 4 shows a process 400 that provides for redirection of client computer devices to a server computer. Process 400 may be implemented as protocol by a client computer and a server computer. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 400 may be implemented, for example, by the system 100 of FIG. 1 and/or the computers 102 and 104 as discussed in FIG. 2, although the process 400 may be implemented by other architectures.

At block 402, a virtual driver (e.g., virtual driver 204) is created at the server computer 104. The virtual driver 204 is created based on information received by server computer 102 from a client computer (e.g., client computer 104) describing a connected device (e.g., local device 108). The virtual driver 204 is recognized by an application (e.g., application 202) at the server computer, and indicates to the application that new hardware or a new device is attached and made available.

At block 404, communication is established between the server computer 102 and client computer 104. The communication may be through a communication link such as a virtual channel. In particular, the communication from the server computer 102 to the client computer 104 may make use of application resident at the client computer, where the application communicates I/O commands with virtual driver. An example of such an application is the remote service client application 220.

At block 406, the application 202 and remote service client application 220 are notified of the availability of the connected device 108 by recognizing the newly created device drivers (e.g., real device driver 228 and virtual device driver 204).

At block 408, the application 202 communicates I/O commands through the virtual device driver 204 which passes the commands to an application such as remote service client application 220. The commands are passed on to the real device driver 228 which allows the local device 108 to communicate as expected through the local driver stack of client computer 104.

CONCLUSION

The above-described methods and system described supporting at a server computer, remote client computer devices through the use of virtual device drivers. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of supporting a client device, the method comprising:
   receiving, at a server computer, a device notification identifying that a device is connected to a client computer, the device associated with a real device driver located at the client computer;
   receiving information related to the device;
   creating a virtual driver at the server computer based on the information; and
   upon detecting a device generated event notification at an application of the server computer, redirecting, by an upper level filter driver, I/O request packet (IRP) commands using I/O control (IOCTL) code from the application of the server computer through the upper level filter driver, through the virtual device driver of the server computer, to the real device driver on the client computer, wherein the upper level filter driver is located separate from the application of the server computer.

2. The method of claim 1, further comprising
   providing concurrent access to the real device driver from both the client computer and from the application of the server computer.

3. The method of claim 1, wherein the device is installed at the client computer.

4. The method of claim 1, wherein the device is at least one of an audio recorder, digital camera, document scanner, external disk drive, or media reader.

5. A method of redirecting control of a device at a client computer to a server computer comprising:
   establishing communication between the client computer and the server computer via a remote access application resident at the client computer;
   creating a virtual driver at the server computer in response to a connection of the device to the client computer, the virtual driver specific to the device, the device associated with a real device driver resident at the client computer; and
   redirecting an I/O request packet (IRP) command that uses IOCTL code from an application resident at the server computer to the real device driver through an upper level filter driver resident at the server computer.

6. The method of claim 5, wherein the creating the virtual driver includes creating the virtual driver based on information received by the server computer from the client computer describing the device.

7. The method of claim 5, further comprising unloading the virtual driver from the server computer when the device is unconnected from the client computer.

8. A remote access system comprising:
   a server computer;
   a local client computer supported by the server computer;

a device resident to the local client computer;

a real device driver specific to the device and installed in the local client computer;

a virtual driver located in a kernel space of the server to support the device; and an upper level filter driver separate from an application in the server computer, the upper level filter driver to detect a I/O request packet (IRP) commands using I/O Control (IOCTL) code and, upon detection of IRP commands, redirect the IRP commands from the an application in the server computer through the upper level filter driver, through the virtual driver, to the real device driver.

9. The system of claim 8, wherein the server computer includes a redirector that identifies the device.

10. The system of claim 9, wherein the redirector includes a redirection library that provides for communication between the server computer and client computer.

11. The system of claim 9, wherein the local client computer includes a remote service application that provides for communication between the server computer and the local client computer.

12. The system of claim 9, wherein the device is a plug and play (PNP) device.

13. The system of claim 9, wherein device driver is installed with other drivers when the device is connected to the local client computer.

14. The system of claim 9, wherein the command is communicated through a driver stack of the local client computer.

* * * * *